(No Model.) 6 Sheets—Sheet 1.

B. T. BROWN.
GRAIN BINDER.

No. 553,203. Patented Jan. 14, 1896.

Witnesses
Geo. C. Conner
A. S. Courtright.

Inventor
Braxton T. Brown
By Attorney V. H. Lockwood (No Model.)

6 Sheets—Sheet 2.

B. T. BROWN.
GRAIN BINDER.

No. 553,203.

Patented Jan. 14, 1896.

Witnesses
Geo. C. Conner
A. S. Courtright

Inventor
Brasilton T. Brown
By Attorney V. H. Lockwood

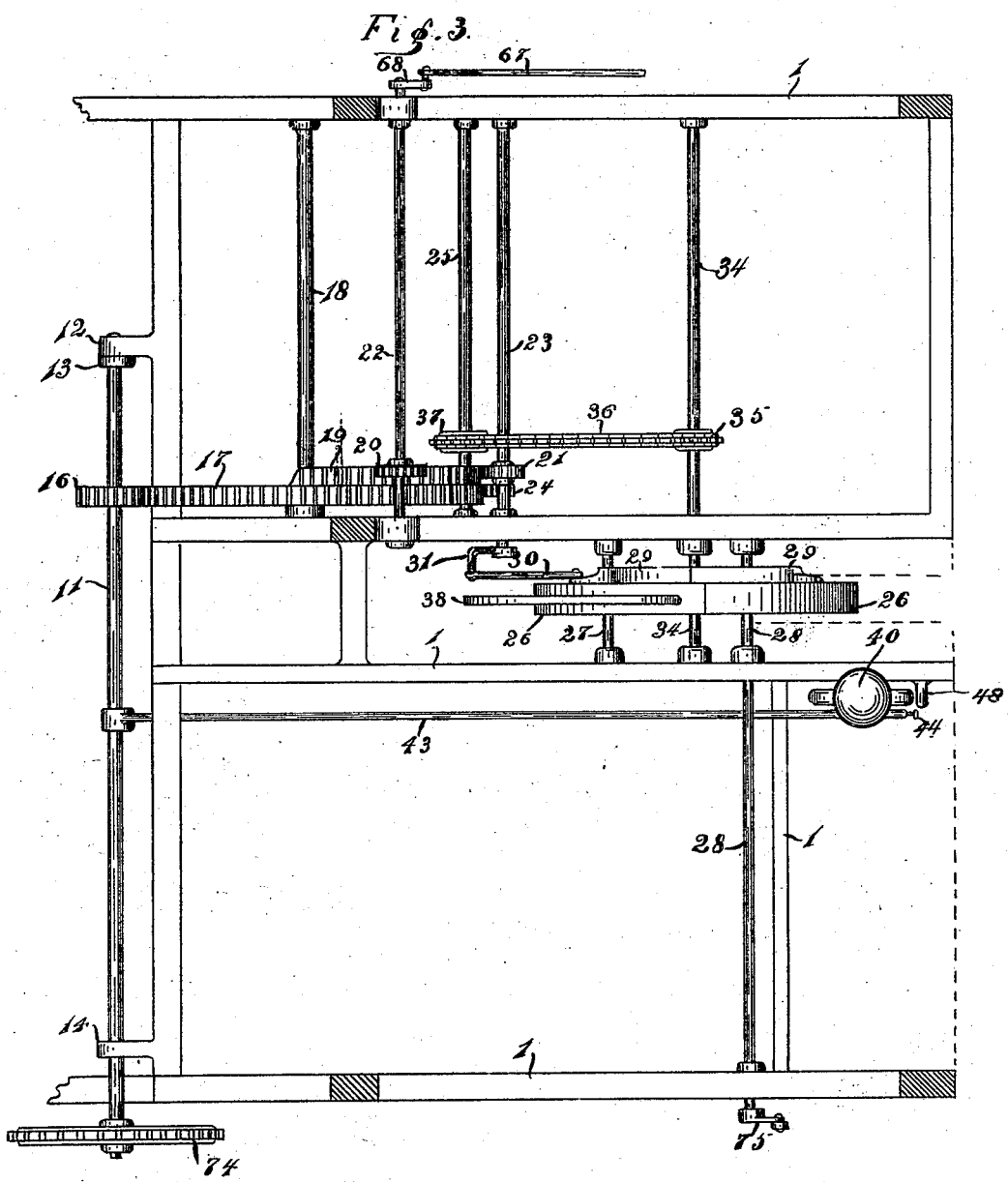

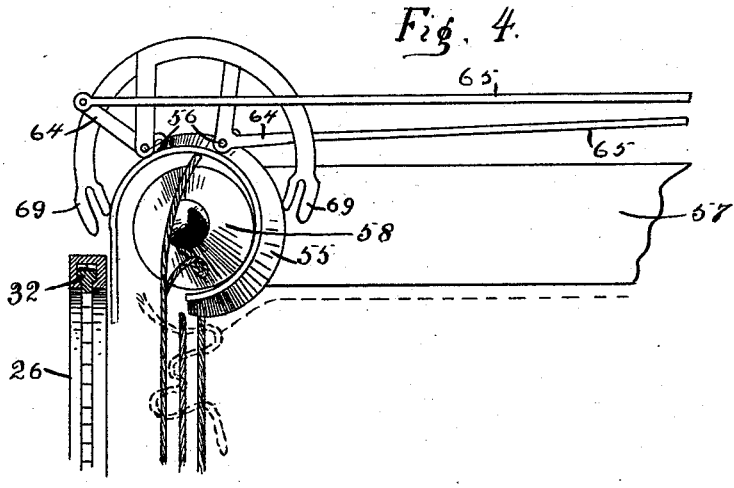
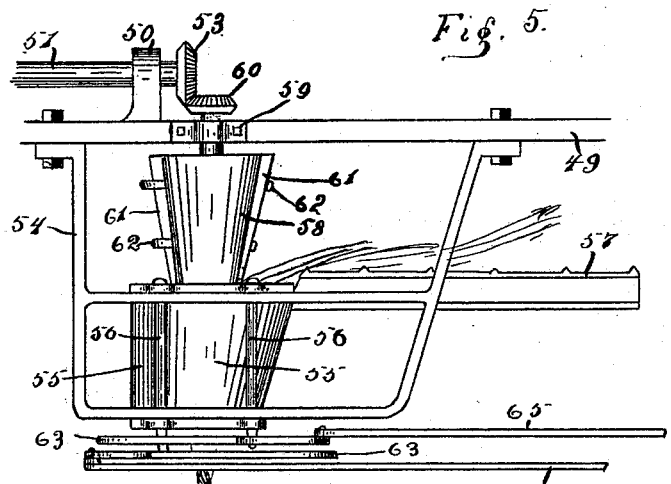
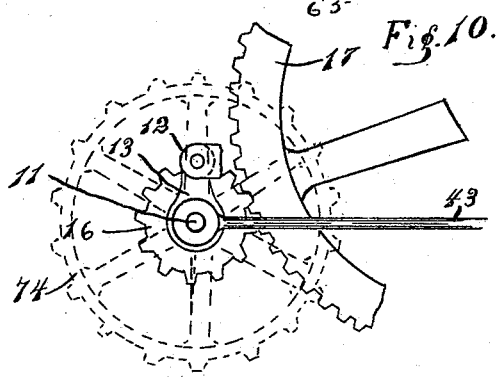

(No Model.) 6 Sheets—Sheet 5.
B. T. BROWN.
GRAIN BINDER.
No. 553,203. Patented Jan. 14, 1896.
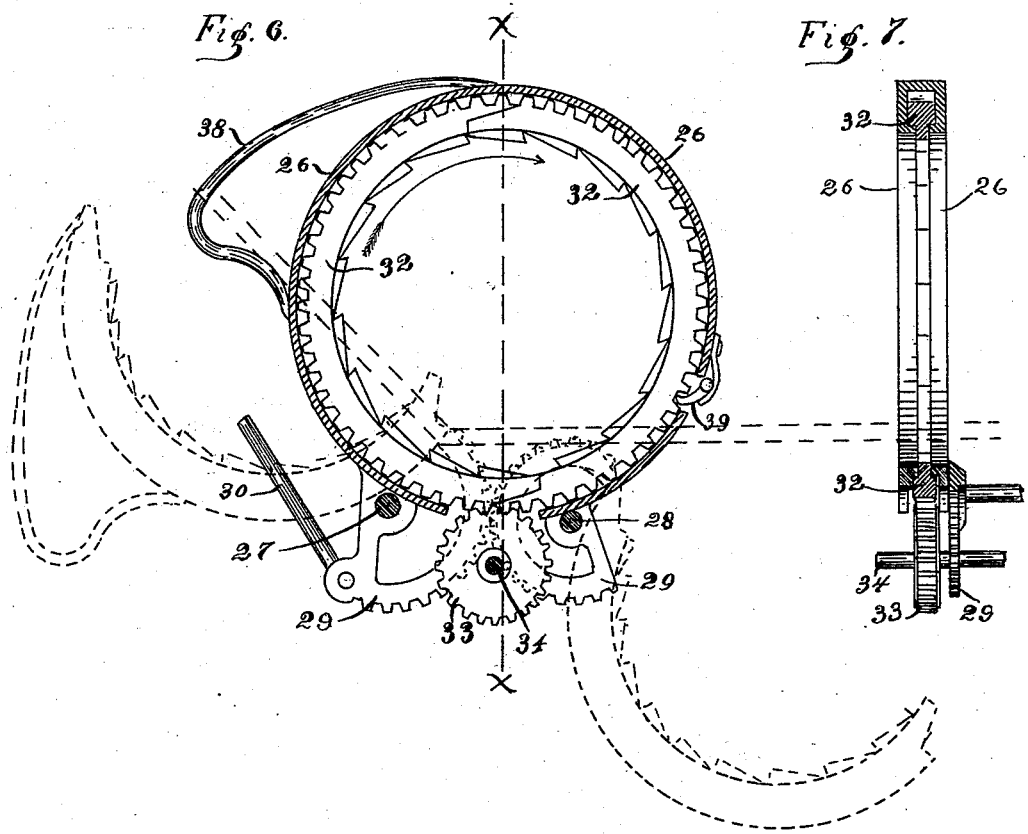
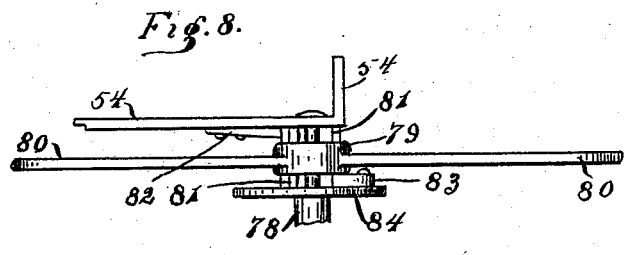
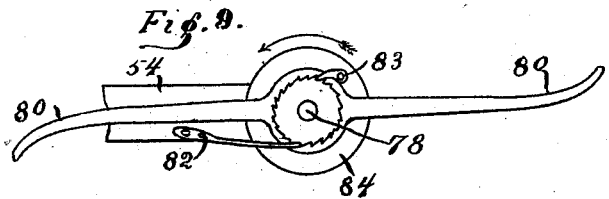
Witnesses
Geo. C. Conner.
A. S. Courtright.
Inventor
Brasitton T. Brown
By Attorney D. H. Lockwood

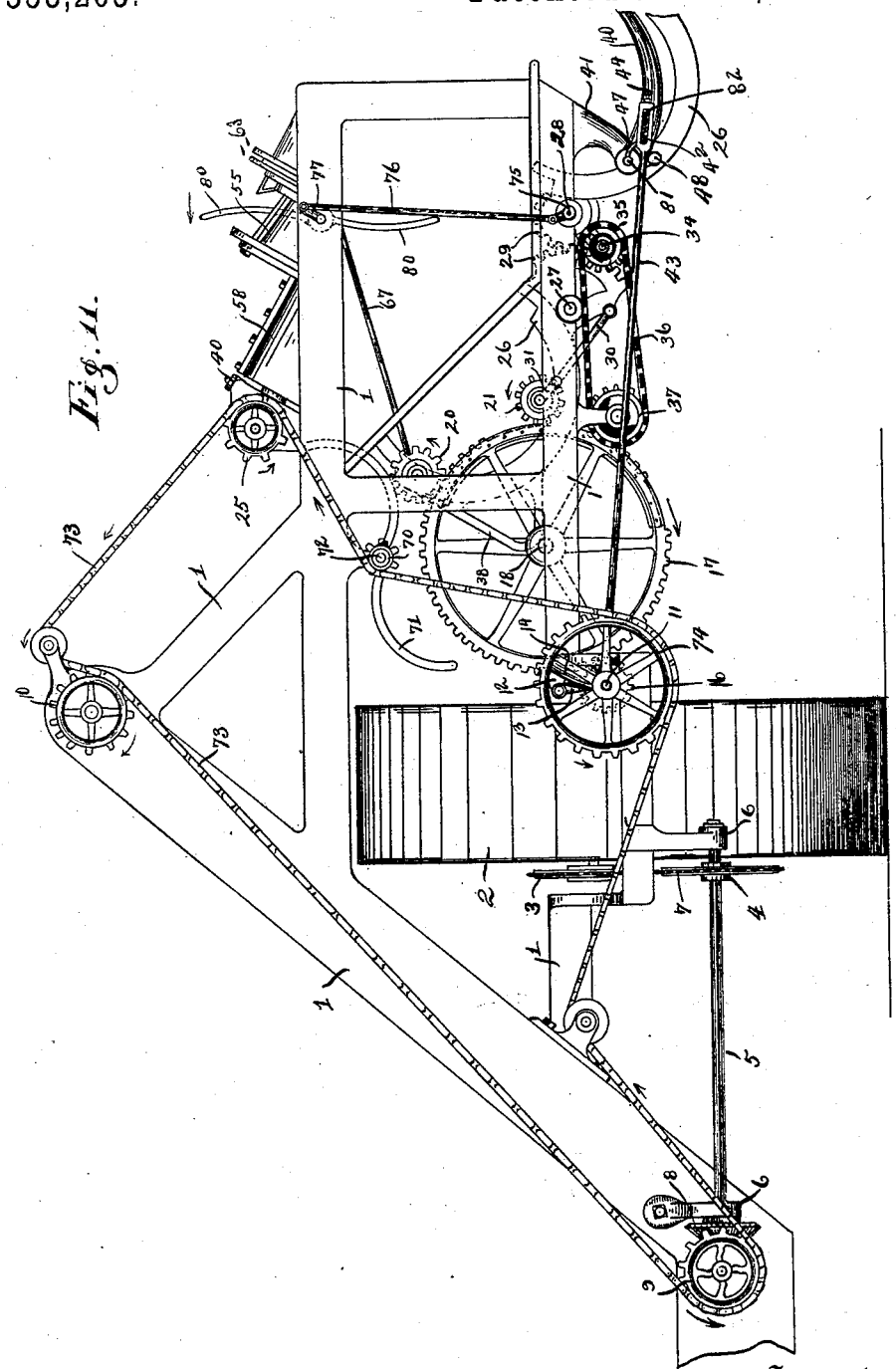

UNITED STATES PATENT OFFICE.

BRASELTON T. BROWN, OF PLAINFIELD, ASSIGNOR TO THE BROWN STRAW BINDER COMPANY, OF INDIANAPOLIS, INDIANA.

GRAIN-BINDER.

SPECIFICATION forming part of Letters Patent No. 553,203, dated January 14, 1896.

Application filed January 26, 1895. Serial No. 536,390. (No model.)

*To all whom it may concern:*

Be it known that I, BRASELTON T. BROWN, of Plainfield, county of Hendricks, and State of Indiana, have invented certain new and useful Improvements in Grain-Binders; and I do hereby declare that the following is a full, clear, and exact description thereof, reference being had to the accompanying drawings, in which like numerals refer to like parts.

My invention relates to new and useful improvements in grain-binders, wherein the binder constructs its own rope from the straw, ties the same, and at certain points discharges the bundle from the machine, and at the same time combines simplicity of construction and efficiency with cheapness.

Figure 1:
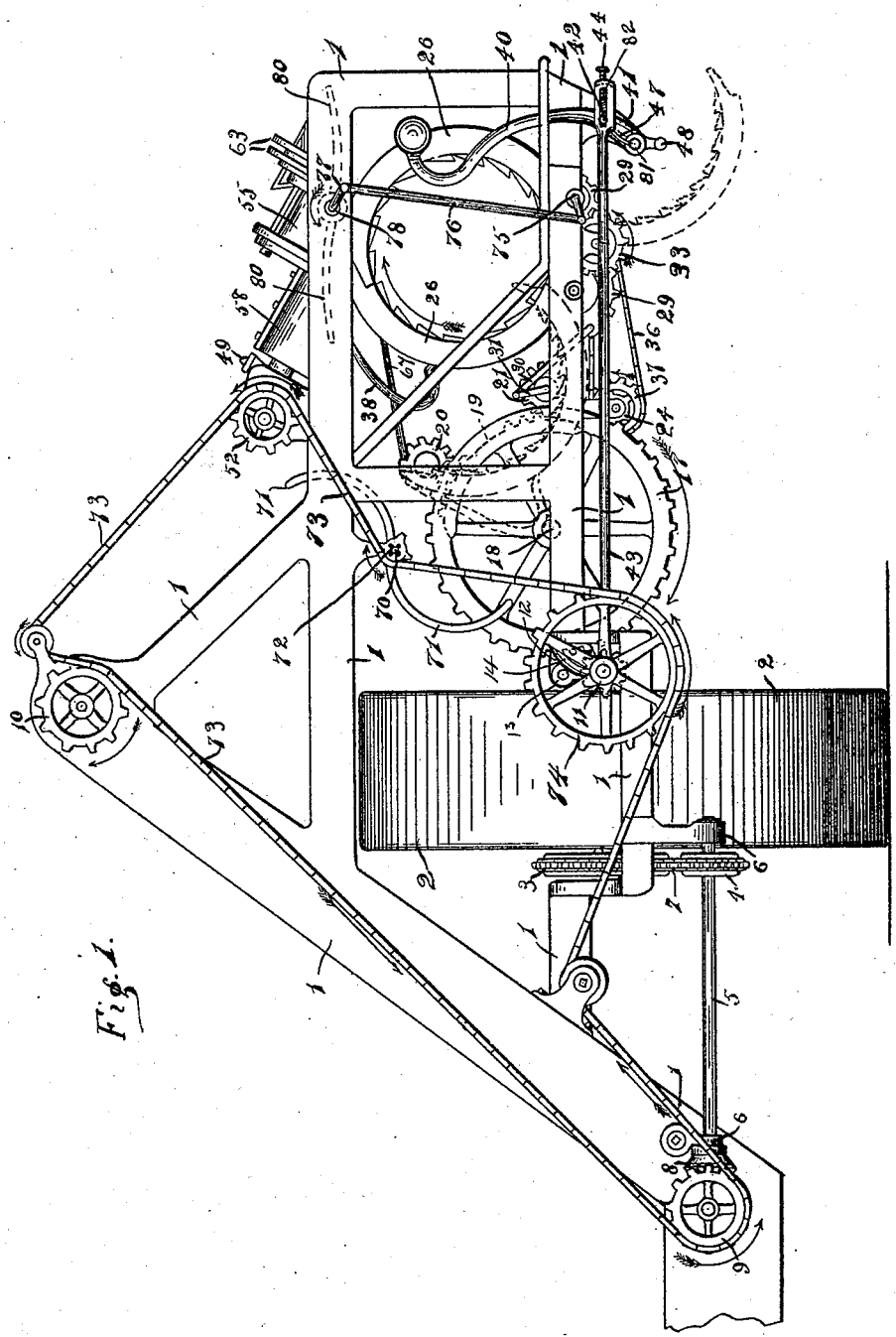
Figure 2:
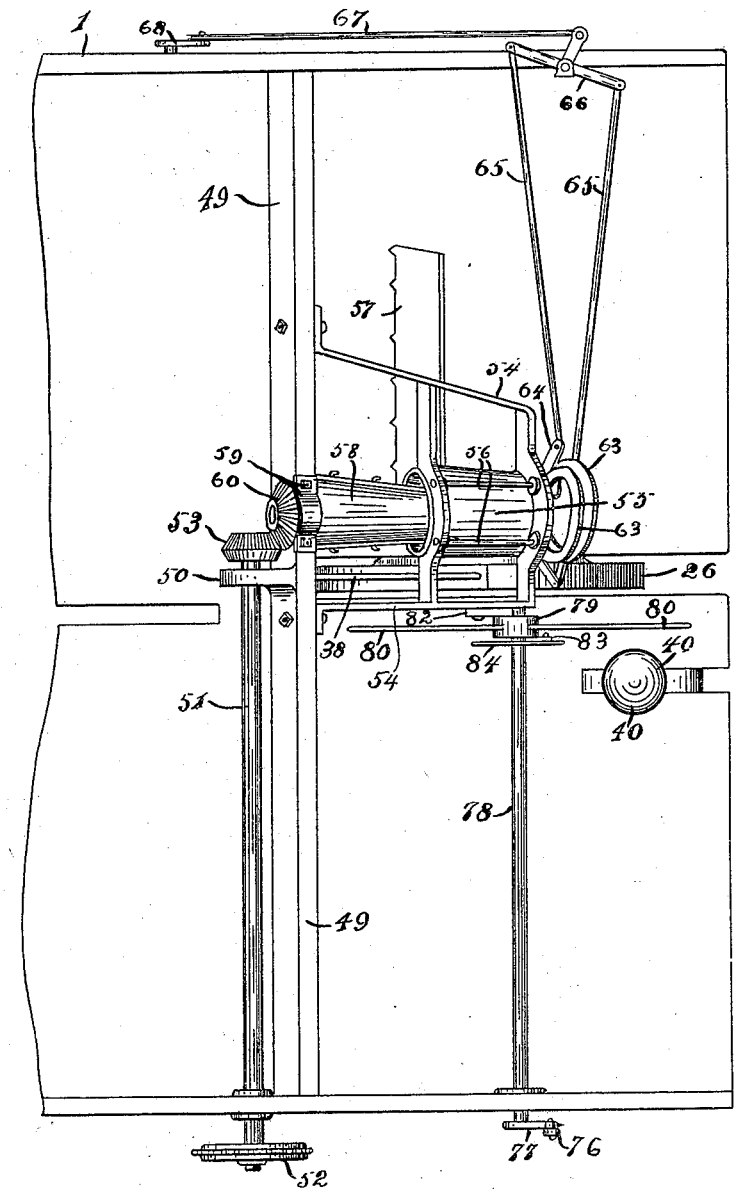

In the drawings, Figure 1 is a view in elevation, showing a part of the rear end of a harvester-machine with my improvements attached thereto. Fig. 2 is a plan view of the same. Fig. 3 is a plan view of a part of the framework of the machine, showing the shafts and their various connections for operating the different mechanisms. Fig. 4 is a front end view of the twister, its surrounding thimble, and the connecting parts. Fig. 5 is a top view of the same. Fig. 6 is a section through the compressor-arms, their coacting parts being in elevation. Fig. 7 is a cross-section through Fig. 6 on the line *x x*. Fig. 8 is a detail plan view of the kickers which eject the bundle from the machine. Fig. 9 is an elevation of the same. Fig. 10 is a detail view showing the manner of throwing the binding mechanism in and out of gear with the main machine. Fig. 11 is a view like Fig. 1 when the binding mechanism is at rest.

In detail, 1 represents the framework of the machine, which is preferably constructed of metal, of any of the well-known forms now used in harvester-machines, and is supported in the usual manner upon a main wheel 2.

3 is a large sprocket-wheel mounted on the shaft of the main wheel, and 4 is a smaller sprocket-wheel carried on a counter-shaft 5, supported in brackets 6 on the outside of the framework, the sprocket 4 being connected by a chain 7 with the sprocket 3, and is thereby driven. On the opposite end of the counter-shaft 5 is a bevel gear-wheel 8, which engages with beveled teeth on the back of the sprocket-wheel 9, which drives one of the grain-elevators, a sprocket-wheel 10 at the top of the machine driving the other one.

11 is a shaft, its outer end having loose bearings in a bracket 14, secured to the framework, its inner end being carried in a boxing 13, swung from the bracket 12, secured above to the framework. Also mounted on the shaft 11 is a small gear-wheel 16, which, through the rocking movement of the shaft 11, is adapted to be swung in or out of engagement with the large gear-wheel 17, carried on the shaft 18, having bearings in the framework toward the front of the machine. This gear-wheel, as shown in Figs. 1 and 3, has formed on one of its sides and below a line with the main teeth two auxiliary sections of teeth 19, these teeth in line with and adapted to engage with the gear-wheels 20 and 21, carried on the counter-shaft 22 and 23, having bearings in the framework 1. The gear-wheel itself, 17, operates to drive the smaller gear 24, carried on the counter-shaft 25, having bearings in the framework.

26 are compressor-arms, each of a semi-circular shape, and adapted to fit closely together when closed, their cut ends overlapping, as shown in Fig. 1, and are mounted at their lower ends on the shafts 27 and 28, having bearings in the center of the framework, each of the arms 26 having formed below its pivotal point a toothed segment 29, these engaging with each other, a rod 30 being pivoted to the inner segment, and also to a crank 31 formed on the end of the counter-shaft 23. The insides of the compressor-arms 26 are cored out to form a seat for a divided ring 32, its inside periphery having teeth or hooks formed thereon which project through the slotted inner face of the arms 26, for the purpose of rotating the bundle, and its outer periphery having gear-teeth which when the compressor-arms are closed and the two segments of the ring brought together are adapted to engage with the teeth of the gear-wheel 33 mounted on the shaft 34 immediately below the compressor-arms. This shaft upon which the gear is mounted carries to one side the sprocket-wheel 35 connected by a chain 36 to the wheel 37 carried upon the counter-shaft 25 before mentioned.

It will be understood by reference to Fig. 6 that the main part of the compressor-arms is above the table of the harvesting-machine, working through a suitable opening in this table, and 38 is a guard attached to the inner arm for preventing the grain from slipping in against the back of such arm as it comes down from the elevator, and thus clogging the machine.

39 is a spring-operated pawl pivoted to the outside of the outer compressor-arm, and works through an opening in such arm, engaging with the cogs on the outer periphery of the ring 32, so that when the compressor-arms are opened and thrown back and down, as shown in dotted lines in Fig. 6, the ring will be held in place so it cannot escape.

40 is a trip, its upper end extending above the table of the machine and to one side of the compressor-arms, its lower end being pivoted to the bracket 41 by the pivot 81, and a short distance above its pivotal point, as seen in Fig. 1, is secured a pin 42, which works in the slot in the end of the link 43, whose opposite end is secured to the shaft 11, whereby the trip automatically throws the binding mechanism in gear when the bundle collected against it has become large enough to bind, as then the trip is pushed back and by means of the link 43 and shaft 11 draws the pinion 16 into engagement with the wheel 17 and throws such mechanism in gear. The setscrew 44 is to adjust the trip and link 43 so that they will throw the binding mechanism in and out of gear at the proper time. Within the slot in the end of the link 43 there is a spiral spring 82, with one end abutting against the adjusting-screw 44 and the other against the pin 42, to enable the arm 40 to pass from the position shown in Fig. 1 to that shown in Fig. 11.

The normal position of the pivoted trip 40 is, as shown in Fig. 1, when it is up and is not pressed back by the bundle, and it is retained in such position by a spring 47 coiled around its pin 42 and rigidly secured to the pivot 81, and when the trip drops or is forced downward it is brought immediately back to its normal position through the strength of the spring, a lug or projection 48 being formed on the lower end of the bracket to limit the downward movement of such trip. By tightening up the set-screw 44 the trip 40 will act sooner on the link 43 and thus cause the binding mechanism to be thrown in gear by a small bundle. By loosening the screw 44 a larger bundle will be required to throw such mechanism in gear.

Rigidly secured between the side arms of the machine-frame and above the grain-table of the same is the cross-piece 49 having a bracket 50 formed on its back at about the central point in which the inner end of the counter-shaft 51 has a bearing, its outer end having a bearing in the machine-frame and carrying a sprocket-wheel 52, through which it is operated, a beveled gear 53 being connected to its inner end.

To the cross-bar 49 is formed a skeleton bracket 54, as shown in Fig. 2, and this is intended to provide a support for a conical thimble 55, it having lugs formed on its top through which and the bracket itself the rods 56 pass, 57 being a toothed rake or arm secured on one side of the thimble and in such line as to catch a number of straws off the bundle as the latter revolves. The thimble, as shown in Fig. 4, is supported at one side of the compressing-arms 26, and its under side is open.

58 is a conical twister mounted on a stubaxle having bearings in the boxings 59 secured to the cross-bar 49, and carries on its inner end a beveled gear 60, which engages with the gear on the end of the counter-shaft 51 and is thereby driven. The twister itself consists of the conical head 58 and the two flat blades or guards 61 running longitudinally its length on opposite sides, hooks 62 being secured to the twister on one side of these guards, as shown.

63 are tuckers, (shown in Fig. 4,) their inner ends pivoted on the rods 56 by which the thimble 55 is supported from the bracket, and 64 are cranks formed integral with the tuckers, and extending from their pivotal points to the outer ends of the cranks, there being connected links 65 pivoted to a double operating-lever 66, which is in turn pivoted to a bracket on the framework of the machine, the double lever having a central arm connected by a rod 67 with a crank 68 formed on the outer end of the shaft 22 before mentioned. The tucker-arms, as shown, are pivoted to the thimble on opposite sides of its center and have fingers 69 formed on their outer ends for tucking and thus tying the straw rope around the bundle of grain, as will be hereinafter described.

70 is a counter-shaft having bearings in the framework of the machine, and carries at about its center a pair of curved arms 71, which work alternately through an opening in the sloping grain-table and regulate the feed of the grain toward the compressor-arms. On the outer end of the counter-shaft 70, which carries the arms 71, is mounted a sprocket-wheel 72, and around this for operating it is an endless chain 73, which also passes around the sprocket 74 mounted on the outer end of the shaft 11 and also around the sprockets 9, 10, and 52 and over several idler-pulleys, the several parts of the machine being operated by the main wheel 2 of the machine through the chain.

75 is a crank mounted on the outer end of the shaft 28, which carries the outside compressor-arm, this crank being connected by a rod 76 with a smaller crank 77 carried on the outer end of the counter-shaft 78, having bearings in the framework 1 of the machine and on one side of the bracket 54, which carries the twister and its thimble. Loosely mounted on the inner end of the counter-shaft 78 and against the bracket 54 is a band or collar 79 having extending therefrom on opposite sides the two kickers 80, as shown in Figs. 8 and 9. On either side of the collar 79, and integral therewith, are formed teeth 81, the inner series of which engage with a spring 82 secured to the bracket 54, and the kicker-arms are thereby prevented from turning backward. The teeth on the outside of the collar are adapted to engage with a pawl 83 pivoted to the collar or plate 84, which is keyed on the counter-shaft 78, and through the movement of the counter-shaft 78 and the engagement of the pawl 83 with the teeth 81 the kickers are rotated.

The operation is as follows: The grain as it is deposited from the elevators upon the sloping part of the table of the machine will be carried down and fed on the flat part of the table against the trip 40. When enough grain is thus collected to push the trip 40 back far enough to cause the link 43 to draw the pinion 16 into engagement with the wheel 17, the binding mechanism starts and the parts operate in the direction of the arrows. As the number of teeth in each of the two auxiliary series on the side of the gear-wheel 17 are preferably composed of half the number of teeth formed on the engaging gear-wheel 21, the main gear-wheel will have to make one revolution to complete the operation of both opening and closing the compressor-arms 26, and as these close, the gear-wheel 33 beneath them will at that point engage the teeth formed on the periphery of the ring 32, and it will be rotated and carry around with it the grain which has been gathered up by the compressor-arms in their closing movement, the two sprocket-wheels 35 and 37 being of such size as always to bring the cut ends of the ring to the same points on the compressor-arms at about the time the gear 33 disengages the ring 32. After the grain has been fed down to the compressor-arms against the trip-lever, and when the bundle of grain that has been gathered up by the compressor-arms begins to revolve, the butt end half of the loose straws on the top of the bundle will be caught by the fork or arm 57, as shown in Fig. 5, and the ends being carried through the thimble, they will thereby be retained within the band while the head ends are left in the bundle. Their butt ends slipping through the thimble after leaving the fork will be caught on the two series of hooks secured to the sides of the twister, which, revolving, will carry them with it, and at the outer end of such twister the strands will be twisted together, at the same time, these being continually reinforced by other straws gathered from the top of the bundle, so that by the time the bundle has made about one and a half revolutions in the compressor-arms a compact rope will have been formed around it that number of times, leaving the head ends of the band-straws retained in the bundle, and thus making a strong and substantial tie. At this point the gear-wheel 20 is in such position in relation to the gear 17 and of such size as to operate on the tucker-arms 63, these being worked through the links 65, and they will be forced downward, one engaging with the loose end of the rope that has been formed and tucking it under the main or central strand, the second catching the rope at a point a little beyond the end of the twister, tucking it under the main strand of the rope in a similar manner to the first, and at the same time pulling or breaking it off from the twister, as shown in Fig. 4. At the same time with the completion of the tucking, which practically ties the bundle, the main wheel of the machine has reached a point where it will operate on the gear-wheel 21 and can open the compressor-arms, as shown in dotted lines in Fig. 1, and by the movement of the outer arm-compressor it will operate through its shaft to turn the crank on its outer end about one-half revolution, this through its connecting-rod turning the crank on the upper shaft 78 in a similar manner, and through the pawl 83 engaging with the teeth 81 on the collar carrying the kickers will operate to turn them one half-revolution, one of them engaging with the bundle which has been released from the compressor-arms, and thereby throwing it off the rear end of the machine, moving with it the pivoted trip and throwing it backward, thus operating to throw the gear-wheel 16 out of connection with the gear 17, and thereby stopping the rotating and tucker mechanism. The trip-arm 40 is returned to its normal position by the spring 47. The gear 17 being provided with the double segment 19, with a space between the segments, as shown in Fig. 1, causes one complete operation of the binding mechanism with each rotation of the gear 17. The lower segment 19 opens the compressor-arms, and at that point in the operation the gear 17 is stopped, as just above described, while the bundle is being collected in the compressor-arms. When the bundle is so large as to actuate the trip mechanism, the latter throws the gear 17 into operation, as heretofore described, and the upper segment 19 closes the compressor-arms and the gear 17 rotates to actuate the rest of the mechanism without further operation of the gear 21 and the compressor-arms until the lower segment 19 comes around again. The machine is so geared that while the gear 17 is passing without engaging the gear 21, as described, the rest of the binding operation will be performed.

What I claim as my invention, and desire to secure by Letters Patent, is—

1. In a grain binder, compressor arms that embrace the grain, a divided ring seated therein and provided with teeth upon its inner periphery and cogs on its outer periphery, a pinion adapted to mesh with the cogs in such ring, and means for operating such pinion, substantially as shown and described.

2. In a grain binder, a pair of compressor arms pivoted at their lower ends on which toothed segments are formed that engage each other, a crank connected with one of them for opening and closing such arms, a divided ring seated in such arms having teeth formed on its inner periphery, and gear teeth on its outer periphery, a gear wheel that meshes with such gear teeth, and means for operating such gear wheel, whereby the ring is rotated within the compressor arms when they are closed, substantially as shown and described.

3. In a grain binder, a pair of compressor arms pivoted to the frame work of the machine and having toothed segments at their lower ends, a divided ring seated in a recess formed in the inner face of such compressor arms and adapted to rotate therein when closed, a pitman connected to the segment of the inner arm and pivoted to the crank on a countershaft, a gear wheel mounted on such countershaft, a larger drive wheel provided with intermittent series of teeth that engage such gear wheel, and means for operating such drive wheel, whereby at predetermined intervals the compressor arms are opened and closed, substantially as shown and described.

4. In a grain binder, a pair of pivoted compressor arms having engaging toothed segments formed on their lower ends with a pitman attached to one whereby the arms are opened and closed simultaneously, a divided ring seated within such compressor arms, the inner face of such ring having teeth thereon and the outer face provided with gear teeth, a gear wheel supported below the compressor arms that engages the teeth on such divided ring, and means of operating such gear wheel whereby the ring is revolved within the compressor arms when the latter are closed, in combination with suitable twisting and tucker mechanisms.

5. In a grain binder, compressor arms, a divided ring seated therein, pinions mounted in the framework means of operating such compressor arms and a divided ring from such pinions, a spur wheel provided with cogged segments adapted to mesh with the pinion actuating the compressor arms, the cogged segments being of such length and the pinions of such relative sizes that the joints of the ring will when it stops moving register with the joints of the compressor arm, substantially as shown and described.

6. In a grain binder, the combination of a conical twister, and a toothed arm extending parallel with the bundle being bound, so mounted that it will catch the butt half of some of the straws on the periphery of the bundle and feed it to the twister, and means for rotating such bundle, substantially as shown and described.

7. In a grain binder, a conical twister mounted on a stub axle, means for rotating such twister, teeth formed in the twister, a thimble supported around the outer end of the twister, and a toothed arm for catching and feeding straws to the twister, substantially as shown and described.

8. In a grain binder, a conical twister on the end of a stub axle, means for rotating the same, teeth formed on the opposite sides of such twister, a thimble supported around the outer end of the twister, a toothed rack extending to one side of such thimble to catch the butt half of some of the straws in the bundle, and means for revolving such bundle whereby such straws are drawn within the thimble and caught by the twister teeth and thereby twisted into a rope, substantially as shown and described.

9. In a grain binder, the combination with a suitable band forming mechanism, of a semi-circular tucker with bifurcated ends, such tucker mounted at the end of the band forming mechanism, means for oscillating such tucker whereby the ends thereof will engage the band after it has been wound about the bundle and secure the same.

10. In a grain binder, a tucker mechanism consisting of a pair of tucker arms attached to bell cranks and adapted to operate in opposite directions, fingers on the ends of such tucker arms, operating rods attached to such bell cranks, such bell cranks being so pivoted that when operated such fingers will catch the band and tuck in the ends thereof, substantially as shown and described.

11. In a grain binder, compressor arms with cogged segments at their pivoted ends that mesh with each other, a driving gear that meshes with the cogged segments a shaft mounted in the frame work, a kicker rotatably mounted on such shaft, a ratchet and pawl connection between the shaft and kicker, cranks on one compressor arm and on the kicker shaft, and a rod connecting the cranks, substantially as set forth.

In witness whereof I have hereunto set my hand this 12th day of July, 1894.

BRASELTON T. BROWN.

Witnesses:
THOMAS RATCLIFFE,
V. H. LOCKWOOD.